June 4, 1935.  O. H. BANKER  2,003,963
TRANSMISSION
Filed March 21, 1930   4 Sheets-Sheet 1
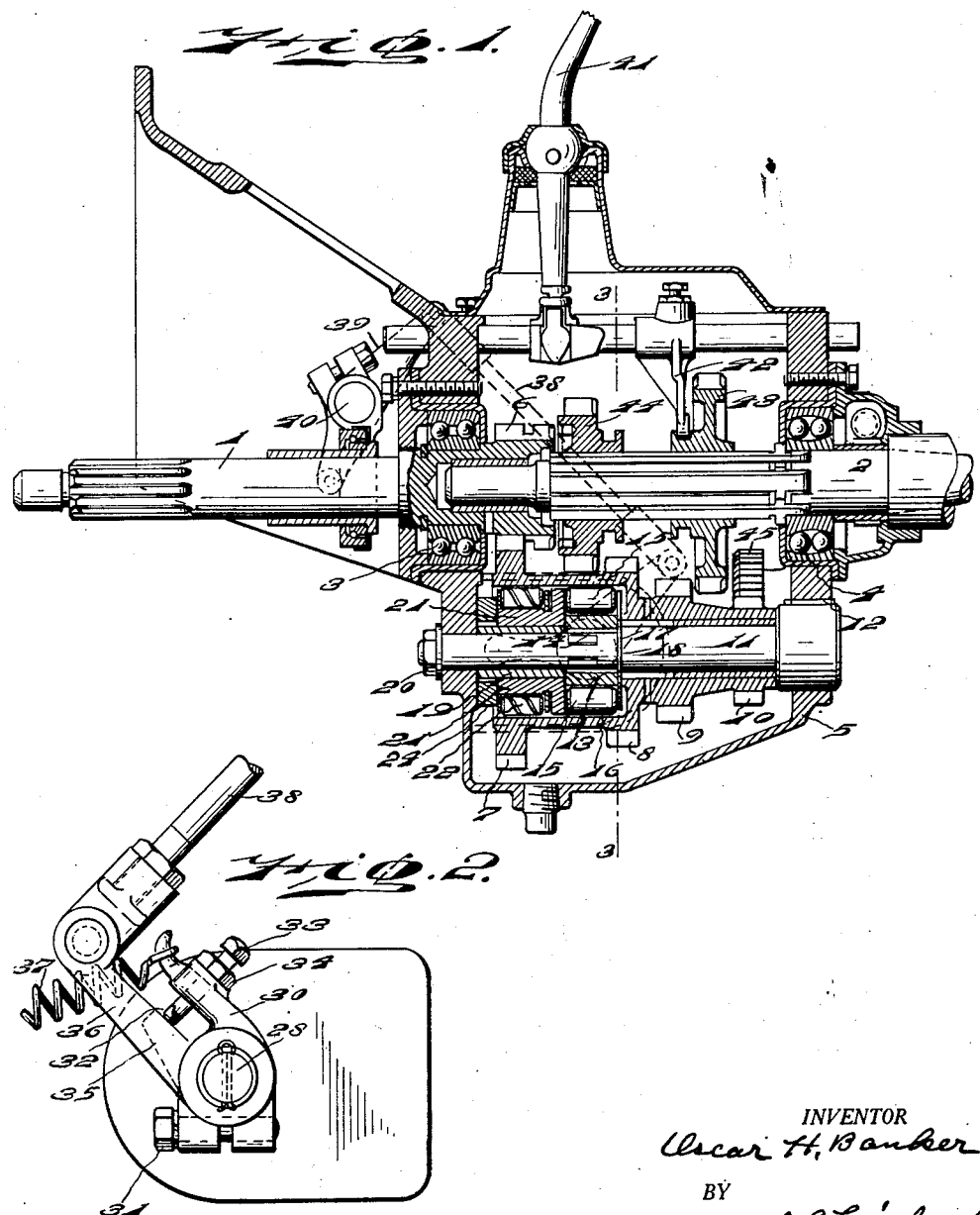
INVENTOR
Oscar H. Banker
BY
Herbert S. Fairbanks
ATTORNEY June 4, 1935. O. H. BANKER 2,003,963
TRANSMISSION
Filed March 21, 1930 4 Sheets-Sheet 2
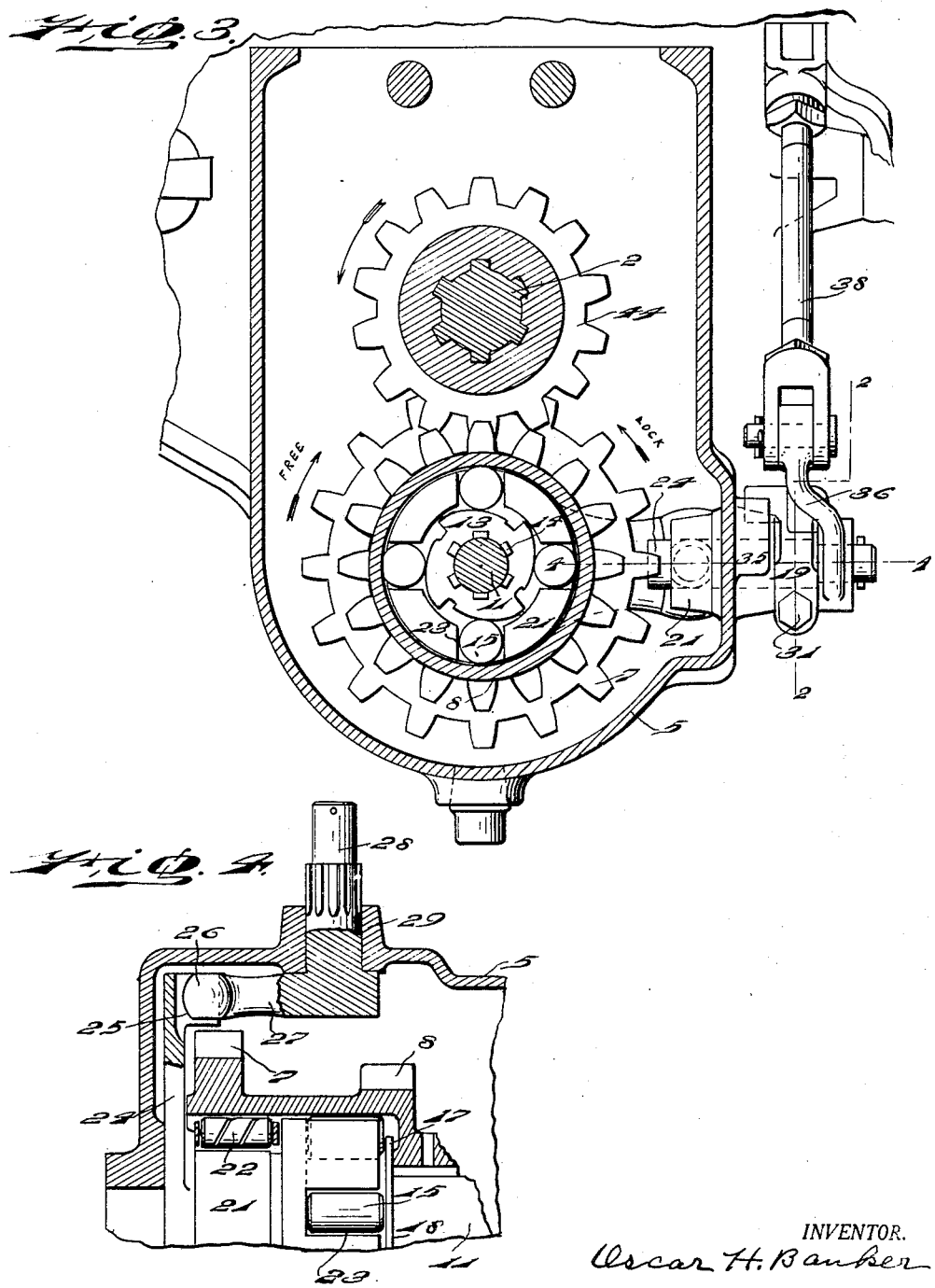
INVENTOR.
Oscar H. Banker
BY
Herbert S. Fairbanks
ATTORNEY.

June 4, 1935.   O. H. BANKER   2,003,963
TRANSMISSION
Filed March 21, 1930   4 Sheets-Sheet 3

INVENTOR.
Oscar H. Banker
BY Herbert S. Fairbanks
ATTORNEY.

June 4, 1935.　　　　O. H. BANKER　　　　2,003,963

TRANSMISSION

Filed March 21, 1930　　　4 Sheets-Sheet 4

INVENTOR.
Oscar H. Banker
BY
Herbert S. Fairbanks
ATTORNEY.

Patented June 4, 1935

2,003,963

UNITED STATES PATENT OFFICE 2,003,963

TRANSMISSION

Oscar H. Banker, Philadelphia, Pa., assignor to Continental Illinois Bank and Trust Company, Chicago, Ill., a corporation, as trustee Application March 21, 1930, Serial No. 437,717

3 Claims. (Cl. 192—4)

The object of this invention is to devise a novel transmission wherein novel means are provided to automatically prevent backward movement of a motor vehicle while on a grade or incline, such means being releasable at the will of the driver to permit forward or backward movement of the motor vehicle without necessitating the application of the brakes of the motor vehicle.

The construction and arrangement of the transmission prevents the motor vehicle from rolling forward when the reverse gearing is in operation.

A further object of the invention is to devise a transmission of the type herein disclosed wherein one-way roller clutches are employed which are ineffective when the gears are in neutral so that the car can be readily moved forwardly or backwardly in garages or parking places.

A further object of the invention is to devise a novel transmission in which if the operator cranks the engine and it back fires, the roller clutch will stop the crank from reversing and breaking the operator's arm or doing other injury.

A further object of the invention is to devise a novel automatic transmission having novel means to automatically prevent improper rearward or forward movement of the motor vehicle without interfering with the normal operation of the motor vehicle or the shifting of the gears and which prevents the stalling of the engine when the motor vehicle tends to roll rearwardly.

In my copending application Serial No. 314,919, filed Oct. 25, 1928, I have described and broadly claimed one type of no-back transmission but this did not have releasing mechanism under the control of the operator as disclosed and generically claimed in the present application.

With the above and other objects in view, as will hereinafter clearly appear, my invention comprehends in its broad and generic scope, a novel transmission which will automatically prevent a motor vehicle from rolling backward when in forward gear and which will automatically prevent the motor vehicle rolling forwardly when in reverse gear.

It further comprehends a novel transmission having automatic no-back mechanism which is releasable at the will of the operator so that the operator can freely shift the gears for a desired forward speed or for a reverse speed.

It further comprehends a novel construction and arrangement of a transmission.

Other novel features of construction and advantage will hereinafter more clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention not limited to the precise arrangement and organization of these instrumentalities as herein set forth.

Figure 1 is a sectional elevation of a transmission embodying my invention.

Figure 2 is a section on line 2—2 of Figure 3.

Figure 3 is a section on line 3—3 of Figure 1.

Figure 4 is a section on line 4—4 of Figure 3.

Similar numerals of reference indicate corresponding parts.

Referring to the drawings:—

Figure 5:
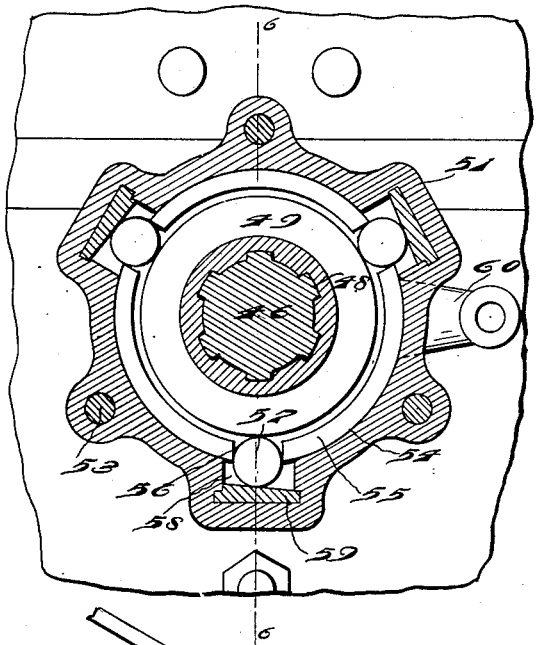
Figure 5 is a sectional elevation of another embodiment of my invention.

Referring first to the embodiment seen in Figures 1 to 4 inclusive, 1 designates the driving shaft and 2 the driven shaft of a novel transmission embodying my invention, said shafts being mounted in antifriction bearings 3 and 4 of the transmission housing 5. The driving shaft 1 is the engine shaft or a shaft operatively connected therewith and has a driving gear 6 fixed to it. This driving gear 6 is always in mesh with a driven gear 7 which forms, with gears 8, 9, and 10, a cluster gear, rotatably carried by a stationary counter-shaft 11 journalled in the housing 5 and keyed to it as at 12.

The countershaft 11 has mounted on it a stationary cam 13, which is fixed and locked in place by the splines 14. 15 are rollers acting between the cam 13 and the wall of the cluster gear recess 16. A disk 17 is also splined to the countershaft 11, and acts as a stop for the rollers 15. The disk 17 rests against a shoulder 18 on the countershaft 11. A sleeve 19 is closely fitted on a reduced diameter of the countershaft 11 and acts as a spacer, so that, when the nut 20 is tightened, the sleeve 19, cam 13 and disk 17 are drawn tightly together and locked between the shoulder 18 and the transmission housing 5. 21 is a bearing member, and roller retainer, loosely mounted on the sleeve 19 and has two steps of diameter at both its inner and its outer peripheries. One step of its inner diameter has a running fit on the sleeve 19, and its other inner diameter extends over the cam 13, as shown in Figure 3. The member 21 is retained between the transmission housing 5 and the cam 13. One of the outer diameters of the bearing member 21 acts as a shaft for rollers 22 which support the cluster gear at one end, said rollers bearing against the wall of the recess 16. The other outside diameter of the bearing member 21 is of less diameter than that of the recess 16 to permit the free turning of the cluster gear.

As best seen in Figure 3, the bearing member 21 has pockets 23, to loosely cage the rollers 15. The bearing member 21 has splined on its outer end, one end of an arm 24. The arm 24 at its opposite end is provided with a slot 25, adapted to receive the ball shaped end 26 of a ball arm 27, which forms a part of a shaft 28, journalled in a bearing 29 cast on the transmission housing 5. A stop arm 30 is fixed to the outer end of the shaft 28 being splined thereon, and it is tightly locked in position by means of a screw 31. The stop arm 30 carries two set screws 32 and 33, each of which is provided with a lock nut such as 34. The set screw 32 is in line with a stationary stop 35 in the form of a lug cast on the housing 5. The set screw 33 is in line with an oscillating arm 36 loosely mounted on the shaft 28. A spring 37 keeps set screw 32 against the stop 35.

The outer end of the oscillating arm 36 is connected by a rod 38, with an arm 39 which is fast on the outer end of the main clutch release shaft 40. As shown in Figure 2, the arm 36 has a desired amount of movement so that the main clutch can be released for the shifting of the gears or stopping the car, and a further movement will move the arm 36 against its set screw 33, thereby moving the stop arm 30. As the stop arm 30 is fixed to the shaft 28, such shaft will move with it as will also the ball arm 27, splined to the bearing member 21, which presses on the clutch rollers 15, moving them towards the lower parts of the cam 13. This releases the cluster gear so that it is free to turn in any direction. The spring 37 effects the return of the clutch rollers to their operative positions.

In the operation of a motor vehicle the gears are shifted by means of a conventional gear shift lever 41 operating shifter forks 42, one of which is shown in Figure 1.

For low speed, the gear 43 is moved to engage the gear 9 and the drive is then through gears 6, 7, 9 and 43, which latter is splined to the driven shaft 2 to drive it.

For second or intermediate speed, the gear 44 engages with the gear 8 and the drive is then through gears 6, 7, 8 and 44, the gear 44 being splined to the driven shaft 2 to drive it.

For high speed the gear 44 engages with the gear 6 so that there is a direct connection between the shafts 1 and 2.

The usual movement of the cluster gear is in the direction of the arrow marked "Free" in Figure 3, but if the vehicle is stopped on an upgrade with gears in mesh and the brake released, the tendency of the movement of the cluster gear is in the direction of the arrow marked "Lock" in Figure 3. This wedges the clutch rollers 15 between the cam 13 and the cluster gear and retrograde movement or rearward coasting of the vehicle is automatically prevented.

If the gears are in reverse and the car is stopped on a down grade, with gears in mesh and the brake released, forward movement of the vehicle is automatically prevented, as is apparent.

45 is the conventional reverse gear in mesh with the gear 10.

The bearing member 21 is in the nature of a releasing member for the clutch rollers 15.

The restraining means are reductively geared relatively to the driving means, which gives less wear on the restraining means.

Figure 6:
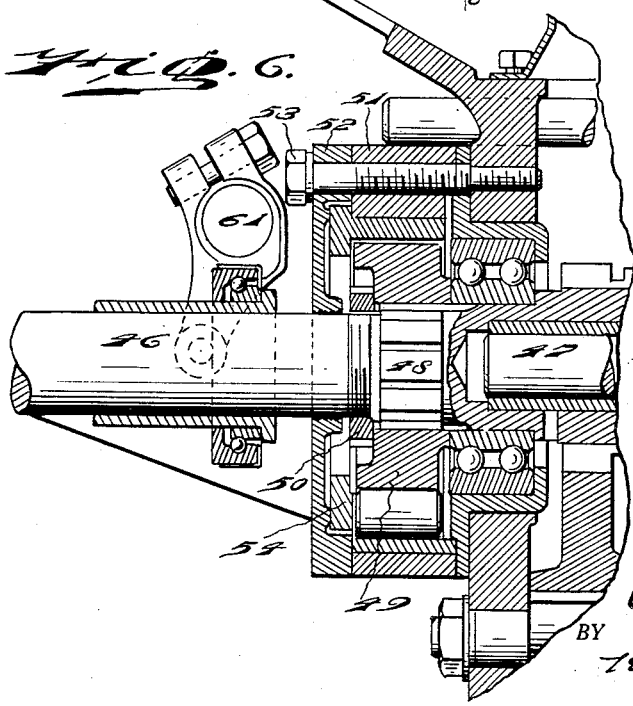
Figure 6 is a section on line 6—6 of Figure 5.
Figure 7:
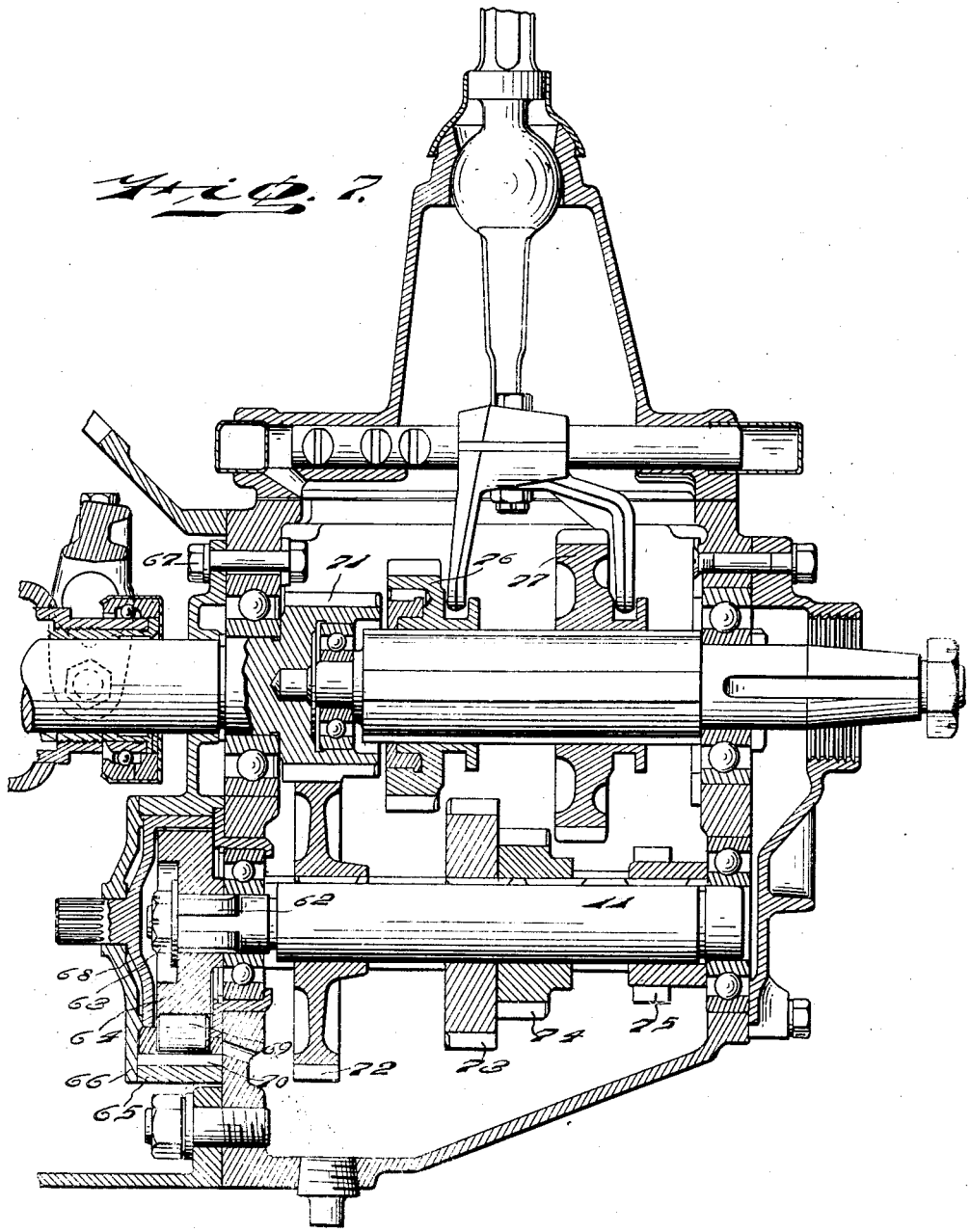
Figure 7 is a sectional elevation of another embodiment of my invention.

The restraining means is not limited to any special location in the transmission. In Figures 1 to 4, I have disclosed it as mounted on a stationary countershaft within the transmission housing. In Figures 5 and 6 it is mounted on the driving shaft. In Figures 7 and 8 it is mounted on the countershaft, but exterior of the transmission housing.

The foregoing and other arrangements too numerous to herein set forth in detail are within the broad and generic scope of this invention.

Referring now to the embodiment seen in Figures 5 and 6, the cluster gear is solid and the other gearing is the same as that already described in connection with Figures 1 to 4 of the drawings.

46 is the driving and 47 is the driven shaft. The driving shaft 46 has fixed to it by splines 48 a cylindrical bearing 49 which is locked in position by a nut 50. A casing member 51 and an end cap 52 are secured to the transmission housing by bolts 53. A cam releasing member 54 in the form of a ring has segments 55 which form pockets 56 to receive the clutch rollers 57. The member 51 is recessed as at 58, and cams or wedges 59 interlock with the walls of said recesses. An arm 60 is connected to the releasing member 54 and connected in any desired or conventional manner to the clutch pedal rod 61, to be operated thereby in a similar manner to that already described by means of a connecting link or links, (not shown).

It will be apparent that the releasing action of the restraining means is the same as that already disclosed in Figures 1 to 4, to automatically lock the transmission, to restrain rearward movement when in forward speed and forward movement when the gears are in reverse.

It is also within the scope of this invention to have the restraining means on a rotatable countershaft as in Figure 7, and exterior of the transmission housing.

The countershaft 11 extends through the housing in Figure 7, and has fixed to it by splines 62 and nut 63, a bearing 64, similar to that in Figure 1. A casing 65 and end cap 66 is secured to the housing by bolts 67. The releasing member 68 has pockets to receive the clutch rollers 69, which ride between the bearing 64 and the cams or wedges 70 as in Figures 5 and 6.

The driving gear 71 meshes with a gear 72, fixed to the countershaft 11, as are also the gears 73, 74, and 75. The shifting gears 76 and 77 are similar to those already described.

The releasing member 68 is connected with clutch throw-off mechanism in any desired or conventional manner to be operated thereby so that the operation and results are the same as that already described in connection with the other figures of the drawings.

In all of the embodiments of my invention herein shown, the clutch pedal is moved its full stroke to release the restraining mechanism so that there is no check or resistance in shifting gears.

In so far as I am aware, I am the first in the art to provide automatic restraining mechanism in a transmission which is releasable at the will of the operator, and I therefore desire to have the claims receive the broad and generic interpretation to which a pioneer in the art is entitled.

It will now be apparent that I have devised a new and useful transmission which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. In a vehicle transmission for operatively connecting a driving and a driven member, a driving and driven gears, a stationary countershaft, a cluster gear on said shaft, driven by said driving member and selectively cooperating with said driven gears to provide a determined gear ratio, a stationary cam, clutch rollers between said cam and cluster gear, a releasing member for said clutch rollers, a shaft having an arm provided with a ball and socket connection with said releasing member and a clutch throw-off mechanism operatively connected with said last-named shaft to actuate it.

2. In a vehicle transmission for operatively connecting a driving and a driven member, a driving and driven gears, a stationary countershaft, a cluster gear on said shaft, driven by said driving member and selectively cooperating with said driven gears to provide a determined gear ratio, and restraining means for said cluster gear, including a releasing member, a rock arm to actuate said releasing member, a stop for said rock arm, an oscillating arm having relative movement with said stop and means under the control of the operator to actuate said oscillating arm to move said stop and thereby said releasing member into released position.

3. In a vehicle transmission for operatively connecting a driving and a driven member, a driving and driven gears, a stationary countershaft, a cluster gear on said shaft, driven by said driving member and selectively cooperating with said driven gears to provide a determined gear ratio, restraining means for said cluster gear, including a releasing member, a releasing member, a rock shaft movably connected with it to actuate it, an oscillating member connected with said rock shaft, a main clutch operatively connected with said member, and a stop for said rock shaft permitting the shifting of gears without actuating the rock shaft.

OSCAR H. BANKER.